United States Patent [19]

Eder et al.

[11] Patent Number: 4,802,205

[45] Date of Patent: Jan. 31, 1989

[54] CIRCUIT ARRANGEMENT FOR TELECOMMUNICATIONS SWITCHING SYSTEMS, PARTICULARLY FOR TELEPHONE SWITCHING SYSTEMS COMPRISING INFORMATION-PROCESSING SEQUENTIAL LOGIC SYSTEMS AND TRAFFIC MEASURING DEVICES

[75] Inventors: Michael Eder, Soyen; Klaus Leutner, Unterhaching; Siegfried Pohl, Oberschleissheim, all of Fed. Rep. of Germany

[73] Assignee: Siemens Aktiengesellschaft, Berlin and Munich, Fed. Rep. of Germany

[21] Appl. No.: 896,253

[22] Filed: Aug. 13, 1986

[30] Foreign Application Priority Data

Aug. 14, 1985 [DE] Fed. Rep. of Germany ....... 3529168

[51] Int. Cl.$^4$ ............................................ H04M 15/10
[52] U.S. Cl. .................................................. 379/113
[58] Field of Search ...................... 379/113, 133, 134; 370/62

[56] References Cited

U.S. PATENT DOCUMENTS

| | | | |
|---|---|---|---|
| 3,517,123 | 6/1970 | Hare et al. | 179/18 |
| 4,497,979 | 2/1985 | Phelan | 179/18 |
| 4,564,725 | 6/1986 | Deisenberger | 179/78 |
| 4,649,234 | 3/1987 | Jans | 379/113 |

FOREIGN PATENT DOCUMENTS 0104637  4/1984  European Pat. Off. .
0121239 10/1984  European Pat. Off. .
0166101  1/1986  European Pat. Off. .
5690692  7/1981  Japan .

OTHER PUBLICATIONS

Telcom Report, 1981, pp. 1–83.

*Primary Examiner*—Stafford D. Schreyer
*Attorney, Agent, or Firm*—Hill, Van Santen, Steadman & Simpson

[57] ABSTRACT

Seizable connection-associated switching devices emit processing requests for incoming information to a central sequential logic system. Processing requests differ on the basis of different urgency degrees which are defined by type of appertaining, connection-associated switching devices. A limit value is set in an occupation non-acceptance device based on the measure of the momentary sequential logic system load. The processing request are rejected (or accepted) by way of a comparison of the respective urgency value to the limit value which is carried out by way of the occupation non-acceptance device, being rejected (or accepted) when the urgency value is lower (or greater) than the limited value. Connection-associated switching devices having the same urgency degree are combined in different urgency groups having different urgency subvalues on the basis of their addresses. Acceptance, as well as rejection, of seizures by the occupation non-acceptance device is also carried out according to these urgency subvalues whose mutual prioritization is cyclically interchanged in uniform time intervals.

3 Claims, 1 Drawing Sheet

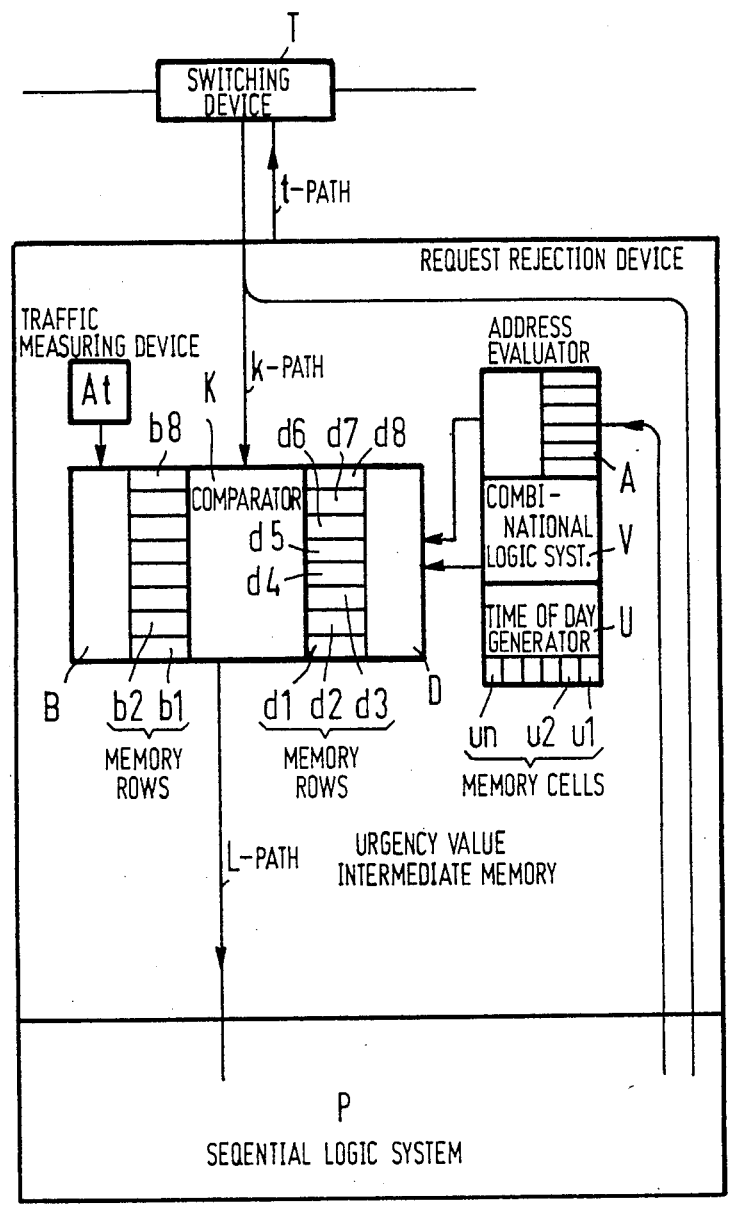

CIRCUIT ARRANGEMENT FOR TELECOMMUNICATIONS SWITCHING SYSTEMS, PARTICULARLY FOR TELEPHONE SWITCHING SYSTEMS COMPRISING INFORMATION-PROCESSING SEQUENTIAL LOGIC SYSTEMS AND TRAFFIC MEASURING DEVICES

CROSS REFERENCE TO RELATED APPLICATIONS

This application is related to application Ser. No. 890,114, filed July 28, 1986 and application Ser. No. 894,763, filed Aug. 8, 1986.

BACKGROUND OF THE INVENTION

1. Field of the Invention

The present invention relates to a circuit arrangement for telecommunications switching systems, particularly telephone switching systems, comprising central and/or sub-central information-processing sequential logic systems having a limited call-handling capacity with respect to the information processing capacity. The systems also comprise traffic measuring devices for identifying the information processing traffic load of a respective sequential logic system and for the recognition of information processing traffic overloads caused by processing requests. Requests nonacceptance devices serve for defense against such overloads in which a critical limit value can be set based on the measure of the respectively identified information processing traffic load. Different degrees of urgency of various types of processing requests have analogous different urgency values individually assigned thereto and, on the basis of a respective comparison of the urgency value of each processing requests to the critical limit value, an acceptance character or a nonacceptance character is assigned when the urgency value is greater, or smaller, than the critical limit value. Each of the processing requests for incoming information are supplied to the sequential logic system for processing in accordance with the appertaining character which has been assigned thereto (or not assigned thereto), whereby above-average urgency processing requests are considered with a certain priority over below-average urgency processing requests in view of the processing in the sequential logic system.

2. Description of the Prior Art

The German published application 3,416,074 discloses a circuit arrangement of the type set forth above. Given a heavier traffic load of the central sequential logic system due to processing requests which makes non-acceptance measures necessary, this circuit arrangement makes it possible to handle these according to the respective degree of urgency, i.e. makes it possible for some of them to still be accepted, but for the rest not to be accepted. The urgency degrees of the connection-associated switching facilities have urgency values assigned thereto which are respectively associated to the processing request output by a connection-associated switching facility to the appertaining information-processing sequential logic system when the former is seized. Dependent on the critical limit value which is set in the request nonacceptance device, the appertaining processing request is still accepted or rejected according to the measure of this limit value by way of a respective comparison of the urgency vale to the limit value.

The connection-associated switching facilities can be subscriber line circuits and connector sets. The latter can be prioritized over the subscriber line circuits. This would mean that, given a certain degree of traffic load, processing requests which come from connector sets would still be accepted but no processing requests deriving from subscriber line circuits would be accepted. The connection-associated switching facilities can also be differentiated into more than two classes and the urgency degrees assigned thereto can also be multiply graduated in accordance with the manner set forth. For the connection-associated switching facilities of a lowest urgency degree (or of a plurality of lowest urgency degrees), this means that the subscribers affected by an increased traffic load and correspondingly more intense non-acceptance measures still have a certain chance for a call set up, particularly in view of the possibility of making emergency calls.

SUMMARY OF THE INVENTION

The object of the present invention, therefore, is to coexploit a circuit arrangement of the type set forth above, in particularly the nonacceptance devices which are among the elements specified therein, for the purpose, given an increased traffic load and correspondingly required, more intense non-acceptance measures, of guaranteeing the minimum chance of a connection set up for the subscribers affected thereby such that this chance exists equally for all subscribe=affected by the non-acceptance measures and is instituted such that it is made as independent as possible of the frequency of seizure attempts by the individual subscribers. A repetition of seizure attempts by a subscriber undertaken in particularly brief time intervals should therefore not provide the subscriber with any greater chance or, at most, with only a slightly greater chance for a successful connection set up attempt. "Pushiness" should therefore not be rewarded and influencing the subscriber behavior in this direction should be avoided.

According to the present invention, the above object is achieved in that switching devices provided in a greater plurality which output the processing requests with the same degree of urgency and to which identical urgency values are assigned by way of their addresses are additionally marked by an ordering value likewise derived from the address, being additionally marked therewith when they output a respective processing request. The urgency values assigned to the processing requests are varied by the ordering values which expand the same, whereby connection requests having originally identical urgency are divided into urgency groups having urgency classifications of different values differing per urgency value. The non-acceptance devices employ the respective urgency classification in the comparison to their critical limit value. The assignment of the plurality of urgency classifications per urgency value to the ordering values is cyclically interchanged in uniform time intervals.

As a result of the above measures, therefore, the connection requests affected by non-acceptance measures and, therefore, the subscribers outputting the connection requests are combined in a plurality of groups to which urgency classifications are assigned such in a cyclically alternating chronologically uniform tempo that these groups are alternately mutually prioritized in sequence by their continuously changing urgency classifications. For example, therefore, in one phase one of these groups can be prioritized over all other such groups, in the next phase the further such group can be prioritized, etc, in a cyclical and chronologically uniform, progressive alternation.

BRIEF DESCRIPTION OF THE DRAWING

Other objects, features and of the invention, its organization, and operation will be best understood from the . detailed description, taken in conjunction with the accompanying drawing, on which there is a single schematic diagram of the circuit arrangement constructed in accordance with the present invention.

DESCRIPTION OF THE PREFERRED EMBODIMENT

The exemplary embodiment illustrated on the drawing shows portions of a circuit arrangement of telephone switching technology which is presumed known in terms of its many possibilities of construction It will be assumed that the present case involves a centrally-controlled telephone switching system in which all of the control events, for example connection set-up events, are centrally or subcentrally controlled. It is also assumed that a central or subcentral information-processing sequential logic system P serves for sequencing such events. Of course, this has limited call-handling capacity with respect to the information processing capacity.

A connection-associated switching device T is shown in the upper portion of the drawing. In fact, connection-associated switching devices are present in a great number. These connection-associated switching devices can be a matter of subscriber line circuits, selection receiving sets, connector sets, terminator circuits of local trunks and long-distance trunks and the like. In case the telephone switching system is constructed in pulse code modulation (PCM) technology, the connection-associated switching device T constitutes ports in the interface groups. More detailed interrelationships regarding this structure are set forth in the description of the digital switching system EWSD in the supplement to the periodical "telcom report", 1981, (background material) as well as in U.S. Pat. No. 4,564,725, fully incorporated herein by this reference.

Information which are to be processed arrive into the connection-associated switching device T. This is thereby a matter of all switching identifiers which are output by subscriber stations from which subscribers intend to establish connections. The analogous case applies to connection-associated switching devices which are not subscriber associated, for example, connector sets, terminator circuits and the like. In addition, the aforementioned German published application discloses detailed particulars regarding the task of processing incoming information.

All of the information coming into the connection-associated switching device T are to be processed by the sequential logic system P which, as already indicated, can also be multiply provided. In a manner known per se, these information are continuously interrogated with the assistance of scan events and are called in from the connection-associated switching device T by the sequential logic system P.

Due to the limited nature of the call-handling capability of the sequential logic system P, the information processing traffic load of the sequential logic system P is continuously measured with known traffic measuring devices. This therefore involves the load of the sequential logic system P with request for processing information arriving into the connection-associated switching device T. A central sequential logic system P can also be burdened with information processing requests which have some other origin, for example for routine checks within the sequential logic system itself, and the like.

The traffic measuring devices, which are presumed here to be known, therefore serve for the identification of the information processing traffic load of the sequential logic system P. This serves for the recognition of information processing traffic overloads caused by processing requests Each information which has arrived in a connection-associated switching device T and which is to be processed results in a processing request which is directed to the sequential logic system P. When the number of information to be processed which arrives overall causes an information processing traffic load at the sequential logic system P, then measures for defense in such overloads are initiated. Request non-acceptance devices are provided for this purpose, these seeing to it that an excess of incoming information to be processed are not accepted. Corresponding connections in the process of being set up are, accordingly not completed; in a known manner, the appertaining, dialing subscriber receives a busy signal Of course, the request non-acceptance devices only have to exercise their effect when the information processing traffic load of the sequential logic system P becomes too high. Depending on the information processing traffic overload of the sequential logic system P which has been reached, a request non-acceptance device must reject more or less all of the incoming information processing requests The degree of the load or, respectively, overload of the sequential logic system P is the determining factor for a percentage of processing requests to be rejected. For this purpose, a critical limit value is adjustable in a request non-acceptance device based on the measure of the respectively identified information processing traffic load. This critical limit value indicates what proportion of the total number of processing requests directed to the sequential logic system P is to be rejected.

As set forth in the aforementioned German published application, the urgency of the various processing requests is taken into consideration in the non-acceptance of processing requests. In the connection set up, for example, it is advantageous to prefer information processing requests for connection set-up events based on the measure of a respective degree of progress which has already been achieved in the respective connection set up and, accordingly, to preferably undertake rejections, insofar as required, in processing requests which relate to information processing events of connections which are still at the beginning with respect to establishment of a connection. It can also be advantageous, for example, to give preference to connection set-up events for outgoing connections over connection set-up events for incoming connections. Accordingly, processing requests of the various types can be equipped with appropriately different urgency degrees. Accordingly, different urgency values are individually assigned to these processing requests which differ in urgency.

The different degrees of urgency of different types of processing requests, however, can also be casually conditioned by different subscriber connection privileges. As an exception, subscriber stations can also have a special connection privilege compared to a normal connection privilege, this special privilege giving them priority over the subscriber stations having normal connection privilege in the establishment of the connection. In addition, however, there can also be catastrophe-prioritized subscriber stations which are, in turn, serviced with a priority over all other subscriber stations in setting up of connections. In this context, therefore, the different urgency degrees of different types of processing requests derive from the different subscriber privileges which are stored for the appertaining subscribers.

A request non-acceptance device then functions in such a manner that it undertakes a comparison of the urgency value of each processing request to a critical limit value. The drawing illustrates a request non-acceptance device K. Processing requests are supplied thereto via a path k. For each processing request, the request non-acceptance device K emits an acceptance character or a rejection character to the sequential logic system P by way of a path L, whereby the sequential logic system P is initiated to accept the appertaining processing request or to reject the same, i.e. to accept the appertaining information to be processed and process the same in a known manner or to transmit a corresponding, contradictory signal via a path t to the connection-associated switching device T, whereby it is signaled that the appertaining connection set up cannot be continued. An appropriate busy signal is sent the calling subscriber in a known manner.

Also indicated on the drawing is a traffic measuring device At with whose assistance a critical limit value is continuously identified, this being accepted in a memory b1–b8 of the request non-acceptance device. In this storage one of the memory rows b1–b8 receives a corresponding marking. Accordingly, a respective one of eight different possible critical limit values may be stored.

The respective urgency value corresponding to a processing request is supplied to an urgency value intermediate memory D which likewise contains eight memory rows d1–d8. The respective urgency value likewise is storable in one of the memory rows of the urgency value intermediate memory D and is correspondingly marked.

The request non-acceptance device further comprises a comparator K which, after arrival of each processing request, compares the urgency value assigned thereto and intermediately stored in the urgency value intermediate memory D to the stored, critical limit value. When the urgency value is greater than the critical limit value, the comparator K emits an acceptance character to the sequential logic system P. When the urgency value is lower than the critical limit value, the comparator K emits a rejection character to the sequential logic system P. The comparator K, therefore, assigns one of the two characters to each processing request, whereby each of the processing requests for incoming information is supplied to the sequential logic system P for processing or is not supplied thereto in accordance with the appertaining character which has been assigned. The possibility is thereby established that above-average urgency processing requests are taken into consideration with a certain priority over below-average urgency processing requests with respect to their processing in the sequential logic system P.

As has been set forth above, processing requests are output with different urgency values. As a result thereof, the processing requests are mutually prioritized based on the measure of the respective urgency degree. In a phase of throttling the traffic load, i.e. when some of the incoming processing requests are rejected, this means that an extremely high proportion of processing requests having a low urgency degree are rejected However, even given this condition, there is the need that subscribers having normal connection privilege from which, therefore, the processing requests always arrive with a very low urgency degree, for example with the lowest urgency degree, nonetheless having a chance of setting up a connection. This requirement is caused by the emergency call possibility which must be established at any time. On the one hand, therefore, the described priority should be guaranteed in the phases when the processing requests are rejected. On the other hand, however, processing requests to which a low, for example the lowest urgency values are assigned, cannot be entirely rejected. It is thereby advantageous to make the chances of success for subscribers not having special connection privileges as independent as possible from the subscriber behavior. This is achieved with the assistance of the structure shown on the drawing.

In order to realize the exchange-oriented events set forth above, it is provided, according to the present invention, that connection-associated switching devices provided in a greater plurality from which the processing requests are output with identical urgency degree and to which identical urgency values are assigned by way of their addresses are additionally marked by an ordering value likewise derived from the address, being additionally marked in this manner upon respective emission of a processing request. Each of the connection-associated switching devices is selectable with the assistance of an address. When a processing request is output, the appertaining address is present in the sequential logic system P. Among other things, this address is supplied to an address evaluator A. This derives the respective urgency value from the respective address. In addition to being defined by the address itself, the urgency value can also be additionally defined by the respective type of information to be processed.

It can now be assumed that a great plurality of processing requests exhibit the same urgency value. Given output of a respective processing request, the address evaluator A additionally derives an ordering value from the respective address of the connection-associated switching device. Let this be composed of the two last bits of a substantially more extensive address information.

The processing requests having the same urgency value are therefore additionally marked by this ordering value which is acquired with the assistance of a address evaluator A. These ordering values partly differ from one another. They are uniformly distributed to the different processing requests, whereby one and the same ordering value continuously reappears, this being true of each of the different ordering values. The urgency values assigned to the processing requests are therefore varied by the ordering values which augment the same. Connection requests originally having the same urgency are thereby divided into urgency groups having different urgency classifications of the different value per urgency value.

As set forth above, the urgency value assigned to each incoming processing request is temporarily stored in the urgency value intermediate memory D. Insofar as the urgency value of the processing requests are varied by the ordering values augmenting the same, the urgency classification deriving by the addition of the ordering value is respectively stored in the urgency value intermediate memory D instead of the urgency value.

Yet to be set forth, then, is how the various urgency classifications are acquired per urgency value. As already set forth, an ordering value augmenting the respective urgency value is identified for certain processing requests with the assistance of the address evaluator A. This ordering value is supplied to a combinational logic system V. A time-of-day (TOD) generator U is also provided, the momentary time of day being stored therein in binary-encoded form. The memory cells un--ul serve this purpose. Each of these memory cells serves for the storage of one bit of the time-of-day information. It is assumed that the memory cells u1 and u2 are provided for the last two place values of the respective time-of-day information. Accordingly, the information in the memory cell ul changes most frequently and that in the memory cell u2 changes with the second highest frequency.

The combinational logic circuit V then combines the ordering value of a processing request with those portions of the time-of-day information stored in the two memory cells u1 and u2. This combination, for example, can occur in the form of a simple ANDing. As a result of the combination with the time-of-day information, an assignment of the plurality of urgency classifications per urgency value to the ordering values is achieved which cyclically changes in a time-dependent manner. The assignment of the plurality of urgency classifications per urgency value to the ordering values is therefore cyclically interchanged in uniform time intervals. As a result thereof, the various subscribers from the processing request initially arrive having the same urgency value have urgency classifications which cyclically change in uniform time intervals. What is therefore achieved is that the chances of success for subscribers not having special connection privileges is more uniformly distributed. In sequence, these subscribers have a chance for success at certain times and do not have this chance at other times; viewed on chronological average, however, these subscribers all have the same chance of success. Given the fundamentally same connection privilege, some of the subscribers are always briefly prioritized over the others. This prioritization changes cyclically among these subscribers. In phases of heavier traffic load and more intense non-acceptance measures, these subscribers thereby always temporarily have a chance of success for establishing a connection, particularly for emergency calls.

In the comparison to their critical limit value, therefore, the non-acceptance devices use the urgency classification insofar as such a classification is acquired in addition to the given urgency value. The urgency classification is additionally acquired in the manner set forth for processing requests which have a relatively low urgency degree, particularly those to which the lowest urgency value is assigned.

As has been set forth above, the comparator K compares the respective urgency value or respectively, the respective urgency classification to the critical limit value. It can be provided that the different frequency values and the different urgency classifications are always equal to the critical limit value which has been set. This can be accomplished in that the critical limit values can also be only uneven numbers, whereas urgency values and urgency classifications can always be only even values In that case where the respective urgency value or the respective urgency classification can also be equal to the critical limit value which has been set, it is provided that an acceptance character is likewise assigned to the processing requests given equality. In contrast thereto, it can also be provided that a rejection character is assigned to the appertaining processing requests in this case.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a circuit arrangement for causing acceptance or rejection of processing requests for an information-processing sequential logic system of a telecommunications switching system from addressable connection-associated switching devices, which logic system has a limited call-handling capability with respect to its information-processing capacity, in which a traffic measuring device identifies the information-processing traffic load of the information-processing sequential logic system caused by processing requests, in which a rejection device serves for defense against such overloads is provided in which a critical limit value can be set based on the measuring of the identified information-processing traffic load, and in which different urgency degrees of different types of processing requests have different urgency values individually assigned thereto, the improvement comprising:

means for comparing the individual urgency values to the critical limit value and producing an acceptance character or a rejection character when the urgency value is greater than or, respectively, lower than the critical limit value;

rejection means for accepting or rejecting the processing requests in response to the acceptance or rejection characters for processing by the sequential logic system so that processing requests having above-average urgency are taken into consideration with a certain priority over processing requests having below-average urgency with respect to their processing in the sequential logic system, means in said rejection means for generating and storing ordering values for each of the different urgency values and assigning a respective rejection character in cyclical succession to a plurality of processing requests of the same urgency which correspond in number to a respective cycle via the urgency classification defined by the urgency and ordering value of the respective processing request of the appertaining type given transgression of the critical limit value; and means for cyclically assigning urgency classification in uniform time intervals.

2. The circuit arrangement of claim 1, wherein:
    said means for generating ordering values comprises means for forming ordering values from the different addresses of connection-associated switching devices of the same type.

3. The circuit arrangement of claim 1, wherein:
    said means for generating ordering values comprises logic means for receiving and combining time-of-day data and ordering values to produce urgency classifications.

* * * * *